United States Patent Office 3,644,625
Patented Feb. 22, 1972

3,644,625
ANESTHETIZATION OF FISH
Richard A. Schoettger, La Crosse, Wis., and Erwin W. Steucke, La Crescent, Minn., assignors to the United States of America as represented by the Secretary of the Interior
No Drawing. Filed Mar. 13, 1969, Ser. No. 807,095
Int. Cl. A61d 7/00
U.S. Cl. 424—258                1 Claim

ABSTRACT OF THE DISCLOSURE

A method for anesthetizing fish comprising exposing the fish to an aqueous solution of a combination of an alkyl aminobenzoate or the methanesulfonate salt thereof and quinaldine or quinaldine sulfate.

---

This invention relates to a method for anesthetizing fish for research or experimental purposes such as artificial spawning, weighing, measuring, marking, surgical operations, photography, etc. A variety of anesthetics have previously been used for these purposes; however, conventional anesthetics have generally been deficient in one or more essential aspects such as effectiveness or safety.

It has now been found that a highly effective and safe anesthetic may be produced by means of a synergistic combination of two anesthetic compounds, i.e. (1) an alkyl aminobenzoate or the methanesulfonate salt thereof, and (2) quinaldine or quinaldine sulfate.

Alkyl aminobenzoates have previously been used as anesthetics. Examples of such compounds, which may be used in the present invention, are methyl, ethyl, propyl, isopropyl, butyl, isobutyl, secondary butyl, tertiary butyl, amyl and allyl esters of ortho-, meta- or para-aminobenzoic acid. In addition, methanesulfonate salts of these compounds, which have also previously been used as anesthetics, may be used in the present invention. A particularly preferred compound is the methanesulfonate of ethyl meta-aminobenzoate which has the formula

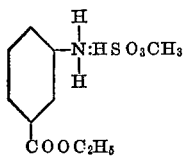

It is a widely used anesthetic compound and has a wide variety of chemical and common names or designations, such as MS-222. It is currently marketed under the trade name of Finquel by Ayerst Laboratories, Inc., New York, N.Y.

MS-222 has previously been found to cause a rapid anesthesia of fish in which the fish are very amenable; however, this compound has the disadvantage that the fish do not tolerate long exposures. Furthermore, the MS-222 is relatively expensive and, in the amounts required for effective anesthesia, is not economical. Quinaldine and quinaldine sulfate also cause rapid anesthesia and the fish tolerate long exposure. However, the fish are less amenable when anesthetized with quinaldine or quinaldine sulfate and may react violently when squeezed or handled in a rough manner.

The combination of the alkyl aminobenzoate or salt thereof, and quinaldine or quinaldine sulfate has been found to be synergistic, i.e., the concentration of each required for effective anesthesia is substantially less than that required when either of the compounds is used alone. The cause of this synergistic action is not known with certainty, but it is believed that the joint action of the mixture may be such that each component enhances penetration of cell membranes by the other. In addition, the combination is safer and less expensive than the alkyl aminobenzoate compound alone while giving much improved amenability as compared to quinaldine or quinaldine sulfate alone.

The anesthetic composition of the invention is employed in aqueous solution. Optimum concentrations of the two compounds will vary widely with the particular species of fish to be anesthetized, since different species differ greatly in sensitivity to the anesthetics, exposures which may be tolerated and recovery times. In addition, temperature may have a significant effect on the sensitivity and tolerance to the anesthetics, higher temperatures generally reducing safe exposure time. In general, however, an effective concentration of the alkyl aminobenzoate compound will be in the range of about 20 to 60 p.p.m., with the corresponding concentration of the quinaldine or quinaldine sulfate being about 2.5 to 20 p.p.m.

More specifically, for anesthetization of rainbow trout, the optimum concentration of the alkyl aminobenzoate compound will be about 20 to 30 p.p.m. and that of quinaldine or quinaldine sulfate about 2.5 to 5.0 p.p.m. These concentrations of the two compounds include loss of reflex, and hence a high degree of amenability, within about 2 to 5 minutes. In addition, the fish generally become relatively amenable before entering loss of reflex. The fish tolerate exposures of one hour or more at these concentrations. Higher concentrations, e.g., 60 p.p.m. of alkyl aminobenzoate compound and 20 p.p.m. of quinaldine, cause even more rapid anesthesia, but the fish tolerate less exposure. Following exposures of up to about one hour the fish usually recover in fresh water within 15 minutes.

Northern pike are somewhat more resistant to alkyl aminobenzoate quinaldine mixtures than are rainbow trout and the most effective mixtures for this species range from about 50 to 60 p.p.m. of alkyl aminobenzoate compound and from about 10 to 20 p.p.m. of quinaldine. These mixtures induce loss of reflex within 4 to 12 minutes and the fish generally recover in fresh water within 30 minutes. Longnose gar, goldfish and black bullheads, which are very resistant to alkyl aminobenzoates, are also anesthetized by a mixture containing about 60 p.p.m. of alkyl aminobenzate compound and 20 p.p.m. of quinaldine.

Suitable temperatures for anesthetization will usually range from about 5 to 27° C., with a range of about 7 to 17° C. generally being preferred. As mentioned above, the lower temperatures are usually preferred since they permit longer safe exposure times.

The alkyl aminobenzoate compounds and quinaldine or quinaldine sulfate are chemically compatible and retain their efficacy when mixed together in a concentrated stock solution. MS-222, in particular, and quinaldine sulfate are solids and may be dissolved directly in water. Quinaldine is a liquid and can be used directly, but is more conveniently measured and used diluted in a solvent such as acetone to make a stock solution. A typical suitable stock solution containing MS-222 and quinaldine may, e.g., be prepared by dissolving 6.307 grams of MS-222 in water and 1.262 ml. of quinaldine in acetone, followed by dilution of a mixture of the two to 100 ml. with 60:40% acetone and water. This solution has been shown to retain its effectiveness after storage in light at room temperature for two weeks.

The following examples will serve to more particularly illustrate the invention and its advantages. Although the preferred aminobenzoate compound, MS-222, is used in these examples, the invention is not limited to this compound, but is applicable to the class of alkyl aminobenzoate compounds disclosed and claimed.

EXAMPLES 1-9

These examples consisted of tests to demonstrate the effectiveness of the preferred anesthetics of the invention for anesthetizing rainbow trout. The tests were conducted in large plastic vessels containing 10 gallons of well water at two temperatures, 12 and 17° C. The two drugs were added to prepare experimental mixtures which ranged in concentration from 20 to 60 p.p.m. of MS-222 and 2.5 to 20 p.p.m. of quinaldine. Experimental conditions and results are shown in Table 1. It will be seen that in each example the anesthetic composition induced loss of reflex within 2 to 5 minutes, or less. In addition, amenability of the anesthetized fish was excellent in each of the examples. By contrast, the concentrations of MS-222 and quinaldine, when used alone, required for anesthesia of rainbow trout in 2 to 5 minutes are in the range of 80 to 135 p.p.m. for MS-222 and 15 to 16 p.p.m. for quinaldine. It is apparent, then, that the effectiveness of the MS-222 and quinaldine are greatly enhanced when used in combination and in suitable proportions.

TABLE 1

| Examples | Concentration ratio MS-222: quinaldine, p.p.m. | Temperature, ° C. | Mean size of fish | | No. of fish | Time in minutes to reach loss of— | | Exposure tolerated, min. |
|---|---|---|---|---|---|---|---|---|
| | | | In. | Lbs. | | Equilibrium | Reflex | |
| 1 | 60:20 | 12 | 11 | 0.6 | 3 | 1 | 2 | 12 |
| 2 | 50:10 | 12 | 11 | 0.6 | 4 | 1-2 | 2-3 | 12-24 |
| 3 | 30:2.5 | 12 | 17 | 1.9 | 3 | 2 | 3-5 | 30 |
| 4 | 30:2.5 | 12 | 11 | 0.6 | 3 | 2 | 3-5 | 60 |
| 5 | 30:5.0 | 12 | 17 | 1.9 | 3 | 1 | 3 | 60 |
| 6 | 20:5.0 | 12 | 17 | 1.9 | 3 | 2 | 3 | 60 |
| 7 | ¹ 30:8.0 | 17 | 11 | 0.6 | 3 | 1 | 2 | 18-28 |
| 8 | 30:5.0 | 17 | 11 | 0.6 | 3 | 1 | 2 | 17-20 |
| 9 | 20:5.0 | 17 | 11 | 0.6 | 3 | 1-2 | 2-3 | 60 |

¹ Quinaldine sulfate.

What is claimed is:

1. A method for anesthetizing rainbow trout for research or experimental purposes comprising contacting the trout with an aqueous solution of a combination of (1) the methanesulfonate of ethyl metaaminobenzoate in a concentration of about 20 to 30 parts per million and (2) quinaldine in a concentration of about 5 parts per million.

References Cited

Muench, Chem. Abs. vol. 53, 20,585g, 1959.
Schoettger et al., Chem. Abs., vol. 67, 18,928b, 1967.

ALBERT T. MEYERS, Primary Examiner

A. J. ROBINSON, Assistant Examiner

U.S. Cl. X.R.
424—303, 310